United States Patent
Elkayam et al.

(10) Patent No.: US 10,910,862 B2
(45) Date of Patent: Feb. 2, 2021

(54) ELECTROMAGNETIC SHIELDING FOR WIRELESS POWER TRANSFER SYSTEMS

(71) Applicant: Apple Inc., Cupertino, CA (US)

(72) Inventors: Shimon Elkayam, San Jose, CA (US); Brandon R. Garbus, Santa Clara, CA (US); Christopher S. Graham, San Francisco, CA (US); Karl Ruben F. Larsson, Los Altos, CA (US)

(73) Assignee: Apple Inc., Cupertino, CA (US)

(*) Notice: Subject to any disclaimer, the term of this patent is extended or adjusted under 35 U.S.C. 154(b) by 413 days.

(21) Appl. No.: 15/701,224

(22) Filed: Sep. 11, 2017

(65) Prior Publication Data

US 2018/0090974 A1    Mar. 29, 2018

Related U.S. Application Data

(60) Provisional application No. 62/542,210, filed on Aug. 7, 2017, provisional application No. 62/399,082, filed on Sep. 23, 2016.

(51) Int. Cl.
  *H02J 7/00* (2006.01)
  *H02J 7/02* (2016.01)
  (Continued)

(52) U.S. Cl.
  CPC ............ *H02J 7/025* (2013.01); *H01F 38/14* (2013.01); *H02J 50/10* (2016.02); *H02J 50/40* (2016.02); *H02J 50/70* (2016.02)

(58) Field of Classification Search
  CPC combination set(s) only.
  See application file for complete search history.

(56) References Cited

U.S. PATENT DOCUMENTS

| 6,127,799 A | 10/2000 | Krishnan |
| 8,115,449 B2 | 2/2012 | Jung |

(Continued)

FOREIGN PATENT DOCUMENTS

| CN | 103928990 | 7/2014 |
| CN | 104242480 | 12/2014 |

(Continued)

OTHER PUBLICATIONS

International Search Report and Written Opinion dated Jan. 30, 2018 in International Application No. PCT/US2017/051147. 24 pages.

(Continued)

*Primary Examiner* — Arun C Williams
(74) *Attorney, Agent, or Firm* — Kilpatrick Townsend & Stockton LLP (57) ABSTRACT

Embodiments describe electromagnetic shielding for wireless charging systems. A wireless charging system includes a transmitter coil configured to generate a magnetic flux, a receiver coil positioned coaxial with the transmitter coil to receive the generated magnetic flux, where electrical interaction between the transmitter coil and the receiver coil generates electric fields, a transmitter shield positioned between the transmitter coil and the receiver coil to intercept some of the electric fields directed away from the transmitter coil and allow the magnetic flux to pass through the transmitter shield, and a receiver shield positioned between the transmitter shield and the receiver coil to intercept some of the electric fields directed away from the receiver coil and allow the magnetic flux to pass through the receiver shield.

20 Claims, 8 Drawing Sheets

(51) Int. Cl.
*H02J 50/40* (2016.01)
*H02J 50/70* (2016.01)
*H02J 50/10* (2016.01)
*H01F 38/14* (2006.01)

(56) References Cited

U.S. PATENT DOCUMENTS

| | | | |
|---|---|---|---|
| 8,618,696 | B2 | 12/2013 | Kurs et al. |
| 9,106,083 | B2 | 8/2015 | Partovi |
| 9,325,197 | B2 | 4/2016 | Hirobe et al. |
| 9,888,619 | B2 | 2/2018 | Haruna et al. |
| 10,084,349 | B2 | 9/2018 | Larsson et al. |
| 2006/0102871 | A1 | 5/2006 | Wang et al. |
| 2006/0145697 | A1 | 7/2006 | Mikhaltsevitch et al. |
| 2008/0061735 | A1* | 3/2008 | Toya ............... H02J 7/0045 320/108 |
| 2011/0050164 | A1 | 3/2011 | Partovi et al. |
| 2011/0278947 | A1 | 11/2011 | Hennig et al. |
| 2012/0049986 | A1* | 3/2012 | Cho .................. H01P 7/005 333/243 |
| 2013/0126622 | A1 | 5/2013 | Finn |
| 2013/0181535 | A1* | 7/2013 | Muratov ........... H01F 38/14 307/104 |
| 2014/0292101 | A1* | 10/2014 | Baarman .......... D06F 75/08 307/104 |
| 2015/0349539 | A1 | 12/2015 | Moyer et al. |
| 2018/0013307 | A1* | 1/2018 | Pudipeddi ........ H02J 7/025 |

FOREIGN PATENT DOCUMENTS

| | | |
|---|---|---|
| CN | 105186703 | 12/2015 |
| EP | 2814046 | 12/2014 |
| EP | 2950416 | 12/2015 |
| EP | 3364433 | 8/2018 |
| JP | 2014225683 A | 12/2014 |
| KR | 1020120029433 | 3/2012 |
| KR | 20150067520 A | 6/2015 |
| KR | 1020150138077 | 12/2015 |
| KR | 1020160028384 | 3/2016 |
| KR | 20160087039 A | 7/2016 |
| WO | 2011040392 | 4/2011 |
| WO | 2013061615 | 5/2013 |
| WO | 2014010342 A1 | 1/2014 |
| WO | 2014178645 | 11/2014 |

OTHER PUBLICATIONS

European Patent Application No. 17777115.1, Office Action, dated Oct. 15, 2019, 14 pages.
Japan Patent Application No. 2018-541305, Office Action, dated Jul. 26, 2019, 5 pages.
Korea Patent Application No. 10-2018-7022242, Office Action, dated Sep. 18, 2019, 15 pages.
U.S. Appl. No. 15/701,237, "Non-Final Office Action", dated Dec. 1, 2017, 16 pages.
PCT/US2017/051147, "Invitation to Pay Add'l Fees and Partial Search Report", dated Dec. 5, 2017, 20 pages.
"Office Action," dated Jun. 5, 2019 in European Patent Application No. 17777115.1-1212. 5 pages.
"Office Action," dated Apr. 20, 2020 in European Patent Application No. 17777115.1-1212. 7 pages.
"Examination Report No. 1 for Standard Patent Application," dated Mar. 5, 2019 in Australian Patent Application No. 2017330514. 3 pages.
"International Preliminary Report on Patentability," dated Apr. 4, 2019 in International Application No. PCT/US2017/051147. 18 pages.
"Notification of the Second Office Action," dated Jun. 5, 2020 in Chinese Patent Application No. 201780014208.0. 20 pages.
Chinese Patent Application No. 201780014208.0, Office Action, dated Nov. 21, 2019, 20 pages.
"Decision to Grant," dated Mar. 3, 2020 in Korean Application No. 10-2018-7022242. 5 pages (includes English translation of allowed claims).
"Final Rejection," dated Mar. 16, 2020 in Japanese Application No. 2018-541305. 8 pages (includes English summary of the final rejection).
"Examination Report," dated Jul. 28, 2020 form the Intellectual Property of India for Application No. 201817031493. 7 pages (includes English translation).
"Notice of Allowance," dated Oct. 5, 2020 form the Japanese Patent Office for Application No. 2018-541-305. 5 pages (includes English translation).

* cited by examiner

ELECTROMAGNETIC SHIELDING FOR WIRELESS POWER TRANSFER SYSTEMS

CROSS-REFERENCES TO RELATED APPLICATIONS

This application is a non-provisional patent application of and claims the benefit to U.S. Provisional Patent Application No. 62/399,082, filed Sep. 23, 2016 and titled "Electromagnetic Shielding for Wireless Power Transfer Systems," and U.S. Provisional Patent Application No. 62/542,210, filed Aug. 7, 2017 titled "Electromagnetic shielding for Wireless Power Transfer Systems" and is related to concurrently filed and commonly assigned U.S. patent application Ser. No. 15/701,237 entitled "INDUCTIVE MODULE", the disclosures of which are herein incorporated by reference in their entirety for all purposes.

BACKGROUND

Electronic devices (e.g., mobile phones, media players, electronic watches, and the like) operate when there is charge stored in their batteries. Some electronic devices include a rechargeable battery that can be recharged by coupling the electronic device to a power source through a physical connection, such as through a charging cord. Using a charging cord to charge a battery in an electronic device, however, requires the electronic device to be physically tethered to a power outlet. Additionally, using a charging cord requires the mobile device to have a connector, typically a receptacle connector, configured to mate with a connector, typically a plug connector, of the charging cord. The receptacle connector typically includes a cavity in the electronic device that provides an avenue within which dust and moisture can intrude and damage the device. Furthermore, a user of the electronic device has to physically connect the charging cable to the receptacle connector in order to charge the battery.

To avoid such shortcomings, wireless charging devices have been developed to wirelessly charge electronic devices without the need for a charging cord. For example, some electronic devices can be recharged by merely resting the device on a charging surface of a wireless charging device. A transmitter coil disposed below the charging surface may produce a time-varying magnetic flux that induces a current in a corresponding receiving coil in the electronic device. The induced current can be used by the electronic device to charge its internal battery.

Some existing wireless charging devices and electronic devices configured for wireless charging have a number of disadvantages. For instance, some wireless charging devices generate an unintended voltage on a receiving coil. The unintended voltage can create noise in the electronic device within which the receiving coil is housed. The noise can cause disturbance of sensitive electronic components in the electronic device, such as touch-sensitive components like a touch-sensitive display. Additionally, the electronic devices also generate an unintended voltage on a transmitter coil in a wireless charging device. The unintended voltage can cause inefficiencies in wireless power transfer.

SUMMARY

Some embodiments of the disclosure provide shielding components for a wireless charging system to avoid the generation of detrimental voltages on a receiver coil and/or a transmitter coil of a wireless charging system during wireless power transfer. In some embodiments, a transmitter shield and a receiver shield are implemented in a wireless charging system to intercept electric fields generated between the transmitter coil and the receiver coil during wireless power transfer. By intercepting the electric fields, detrimental voltages are prevented from being generated on the receiver coil by the transmitter coil, and vice versa, during wireless power transfer.

In some embodiments, a wireless charging system includes a transmitter coil configured to generate a magnetic flux; a receiver coil positioned coaxial with the transmitter coil to receive the generated magnetic flux, where electrical interaction between the transmitter coil and the receiver coil generates electric fields; a transmitter shield positioned between the transmitter coil and the receiver coil to intercept some of the electric fields directed away from the transmitter coil and allow the magnetic flux to pass through the transmitter shield; and a receiver shield positioned between the transmitter shield and the receiver coil to intercept some of the electric fields directed away from the receiver coil and allow the magnetic flux to pass through the receiver shield.

The transmitter shield and receiver shield can each be grounded to discharge voltage generated by the electric field. The transmitter shield can be positioned along the direction of the magnetic flux. The transmitter shield can be formed of a conductive material. In some embodiments, the conductive material can be NiV. The transmitter shield can have a thickness between 20-30 um.

In some embodiments, a wireless charging device configured to generate magnetic flux to perform wireless power transfer can include a driver board; a plurality of transmitter coils disposed above the driver board and configured to generate the magnetic flux upward; an electromagnetic shield disposed above the plurality of transmitter coils, and configured to be transparent to magnetic flux and opaque to electric fields, the electromagnetic shield including: a substrate comprising a stiff material; and a conductive layer disposed on a bottom surface of the substrate; and an adhesive layer disposed between the plurality of transmitter coils and the electromagnetic shield, the adhesive layer configured to attach the electromagnetic shield to the plurality of transmitter coils.

The electromagnetic shield can further include conductive traces embedded within the conductive layer. The traces can be grounded. The traces can be positioned perpendicular to coils of wire of the plurality of transmitter coils. The conductive material can be NiV. The conductive material can have a thickness between 25 to 100 nm. The wireless charging device can further include a ferrite layer disposed between the driver board and the plurality of transmitter coils.

In some embodiments, an electronic device configured to receive magnetic flux for wireless power transfer can include a ferrite layer; a receiver coil disposed below the ferrite layer, an electromagnetic shield disposed below the receiver coil, the electromagnetic shield configured to be transparent to magnetic flux and opaque to electric fields; a conductive adhesive layer disposed between the receiver coil and the electromagnetic shield, where the conductive adhesive layer attaches the electromagnetic shield to the receiver coil; and a protection layer disposed on a bottom surface of the electromagnetic shield.

The transmitter coil can include a coil of wire and an insulating material attached to the coil of wire. The insulating material can be PI. The electromagnetic shield can include a conductive layer. The conductive layer can be formed of silver. The electromagnetic shield can have a thickness between 0.05 and 0.15 µm. The conductive adhesive layer can be conductive pressure sensitive adhesive.

A better understanding of the nature and advantages of embodiments of the present invention may be gained with reference to the following detailed description and the accompanying drawings.

DETAILED DESCRIPTION

Figure 1:
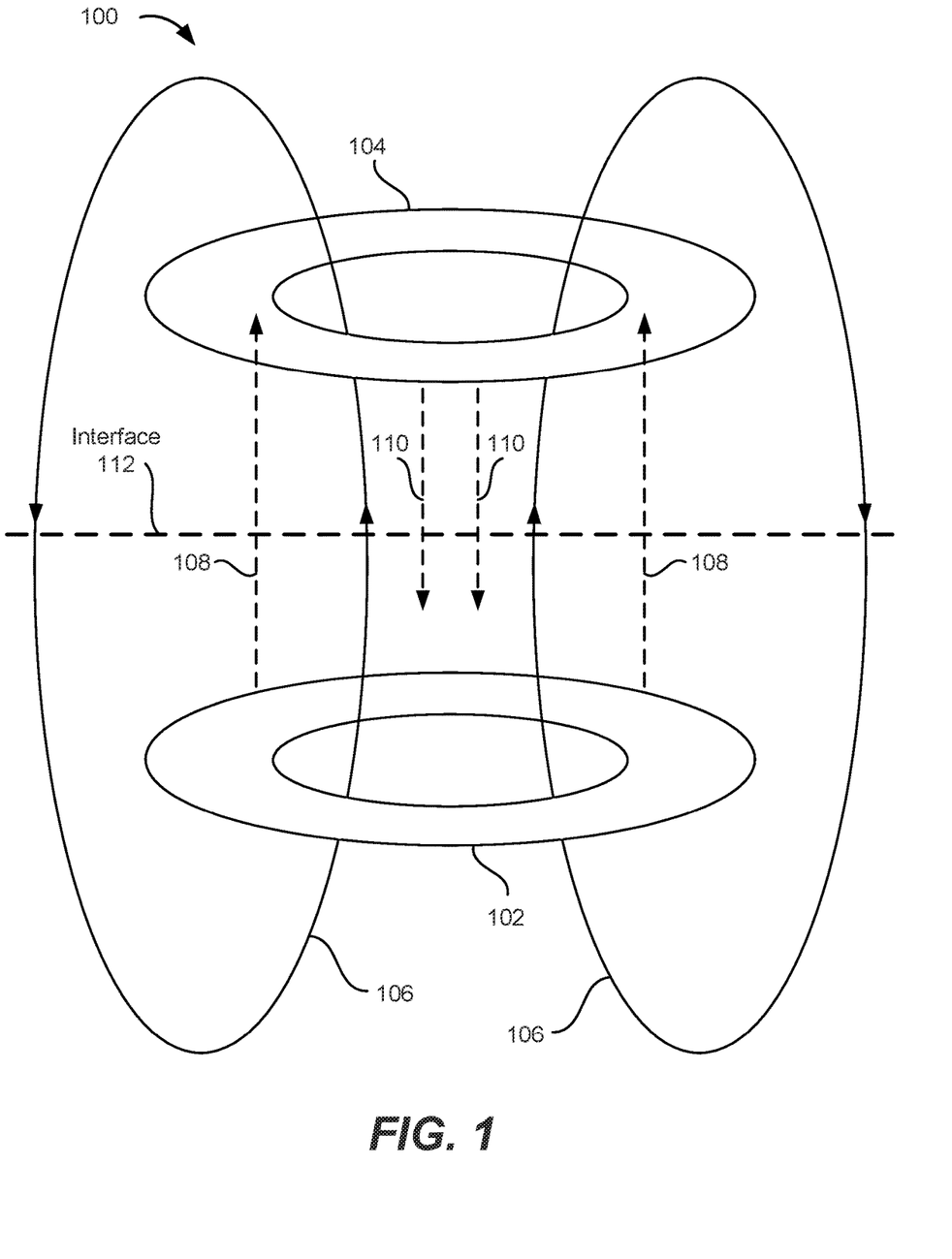
FIG. 1 is a simplified diagram illustrating electrical interactions between a transmitter coil and a receiver coil of a wireless charging system during wireless power transfer.

During wireless power transfer in a wireless charging system, numerous electrical interactions can occur between a transmitter coil and a receiver coil in the wireless charging system. Some of the electrical interactions are intended interactions between the transmitter and receiver coil, while other electrical interactions are unintended interactions that can cause inefficiencies in power transfer and create issues in the electronic device. For example, FIG. 1 is a simplified diagram illustrating electrical interactions between a transmitter coil 102 and a receiver coil 104 of an exemplary wireless charging system 100 during wireless power transfer. Transmitter coil 102 may be disposed within a wireless charging device, such as a wireless charging mat, and receiver coil 104 may be disposed within a consumer electronic device, such as a smart phone, smart watch, tablet, laptop, and the like. The electronic device may rest on the wireless charging device at interface 112 to enable power transfer.

Transmitter coil 102 and receiver coil 104 can be positioned substantially concentric to one another to enable efficient power transfer by means of magnetic induction. During wireless power transfer, transmitter coil 102 can generate time-varying magnetic flux 106, which can propagate through both device housings at interface 112 and be received by receiver coil 104. Time-varying magnetic flux 106 interacts with receiver coil 104 to generate a corresponding current in receiver coil 104. The generated current can be used to charge a battery for operating the electronic device.

In addition to time-varying magnetic flux 106, however, electric fields 108 and 110 can be unintentionally generated between transmitter and receiver coils 102 and 104 during wireless power transfer. For instance, when transmitter coil 102 generates magnetic flux 106, a large voltage difference can exist between transmitter coil 102 and receive coil 104. The voltage on transmitter coil 102 in some cases can be larger than the voltage on receiver coil 104, thereby orienting some electric fields 108 toward receiver coil 104 and causing unintended voltage to be generated in receiver coil 104. In some additional cases, voltage existing on receiver coil 104 may also orient some electric fields 110 toward transmitter coil 102 and cause detrimental voltage to be generated on transmitter coil 102. Detrimental voltages generated on receiver coil 104 may disturb and/or disrupt the operation of sensitive components disposed proximate to receiver coil 104, such as touch-sensitive devices like a touch-sensitive display. And, detrimental voltages generated on transmitter coil 102 may cause inefficiencies in power transfer.

I. Wireless Charging System with Electromagnetic Shielding

Embodiments of the disclosure describe a wireless charging system that mitigates the unintentional generation of detrimental voltage on a receiver and/or a transmitter coil during wireless power transfer. One or more electromagnetic shielding components may be incorporated in the wireless charging system to prevent electric fields from generating detrimental voltages on the receiver and/or transmitter coils, while allowing time-varying magnetic flux to freely propagate between the transmitter and receiver coils to perform wireless power transfer.

In some embodiments, a transmitter shield can be implemented in a wireless charging device to prevent detrimental voltage from being generated on a receiver coil in an electronic device. The transmitter shield can be positioned in the wireless charging device to intercept electric fields generated by the transmitter coil to prevent the electric fields from exposing on the receiver coil. As a result, the intercepted electric fields may generate voltage on the transmitter shield instead of on the receiver coil. This voltage can then be discharged by routing the voltage to ground, thereby disposing of the detrimental voltage and preventing it from affecting sensitive electronic components in the electronic device. In addition to the transmitter shield, a receiver shield can also be implemented in the wireless charging system to prevent detrimental voltage from being generated on the transmitter coil in the wireless charging device. Similar to the transmitter shield, the receiver shield can also be positioned in the electronic device to intercept electric fields generated by the receiver coil so that the electric fields are not exposed to the transmitter coil. Voltage generated in the receiver shield can be discharged to ground to prevent detrimental voltage from being generated on the transmitter coil. Aspects and features of embodiments of such a wireless charging system are discussed in further detail herein.

Figure 2:
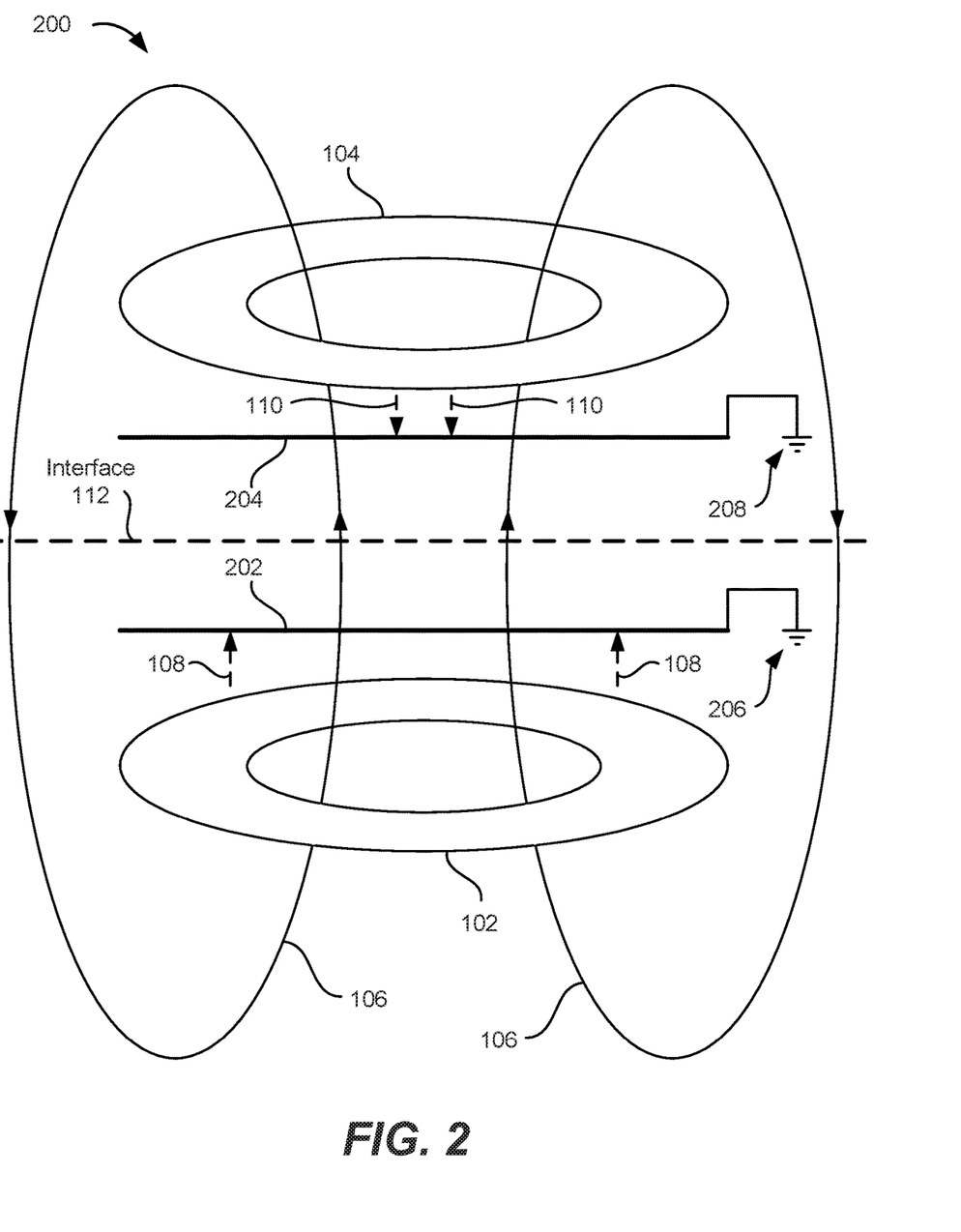
FIG. 2 is a simplified diagram illustrating an exemplary wireless charging system including a transmitter shield and a receiver shield, according to some embodiments of the present disclosure.

FIG. 2 is a simplified diagram illustrating an exemplary wireless charging system 200 including a transmitter shield 202 and a receiver shield 204, according to some embodiments of the present disclosure. Transmitter shield 202 may be positioned in front of transmitter coil 102 so that magnetic flux 106 is directed toward transmitter shield 202. For instance, transmitter shield 202 is positioned between transmitter coil 102 and receiver coil 104 during wireless power transfer so that magnetic flux 106 first passes through transmitter shield 202 before reaching receiver coil 104. In some embodiments, transmitter shield 202 can be positioned between interface 112 and transmitter coil 102 when an electronic device rests on the wireless charging device to perform wireless power transfer. Accordingly, transmitter shield 202 and transmitter coil 102 can both be positioned within the wireless charging device. Transmitter shield 202 can be substantially transparent to magnetic flux 106 so that a substantial percentage of magnetic flux 106 generated by transmitter coil 102 is received by receiver 104.

While transmitter shield 202 can be substantially transparent to magnetic flux 106, transmitter shield 202 can, on the other hand, be substantially opaque to electric field 108 such that electric field 108 is substantially blocked by transmitter shield 202. This prevents electric field 108 from exposing on receiver coil 104 and generating an detrimental voltage on receiver coil 104. Because transmitter shield 202 substantially blocks electric field 108 before it can reach receiver coil 104, electric field 108 may generate voltage on transmitter shield 202 instead of receiver coil 104. The amount of voltage generated on transmitter shield 202 may correspond to the amount of voltage that would have been generated on receiver coil 104 had transmitter shield 202 not been present.

In some embodiments, voltage generated on transmitter shield 202 can be removed so that the voltage does not permanently remain on transmitter shield 202. As an example, voltage on transmitter shield 202 can be discharged to ground. Thus, transmitter shield 202 can be coupled to a ground connection 206 to allow voltage on transmitter shield 202 to be discharged to ground. Ground connection 206 can be a ground ring or any other suitable conductive structure coupled to ground that can remove voltage from transmitter shield 202.

Similar to transmitter shield 202, a receiver shield 204 may also be implemented in wireless charging system 200 to prevent detrimental voltage from being generated on transmitter coil 102 from electric field 110 generated by receiver coil 104. Receiver shield 204 may be positioned in front of receiver coil 104 so that magnetic flux 106 first passes through receiver shield 204 before exposing on receiver coil 104. In some embodiments, receiver shield 204 is positioned within a housing of an electronic device within which receiver coil 104 is also disposed. Thus, receiver shield 204 can be positioned between interface 112 and receiver coil 104 when the electronic device rests on a wireless charging device to perform wireless power transfer.

Similar to transmitter shield 202, receiver shield 204 can be substantially transparent to magnetic flux 106 so that a substantial percentage of magnetic flux 106 generated by transmitter coil 102 passes through receiver shield 204 and is received by receiver 104, while receiver shield 204 can be substantially opaque to electric field 110 such that electric field 110 is substantially blocked by receiver shield 204. This prevents electric field 110 from being exposed to transmitter coil 102 and generating an detrimental voltage on transmitter coil 102 while enabling wireless power transfer. Like transmitter shield 202, receiver shield 204 may also be grounded so that voltage generated by electric field 110 may be discharged to a ground connection 208. Ground connection 208 may be a structure similar to ground connection 206 in some embodiments, or it may be the same structure as ground connection 206 in other embodiments.

By incorporating transmitter and receiver shield 202 and 204 into wireless charging system 200, the wireless charging device and the electronic device within which transmitter and receiver shields 202 and 204 are implemented are exposing their grounds to each other. This mutes any ground noise caused by the electrical interactions between transmitter and receiver coils 102 and 104.

As can be appreciated by disclosures herein, transmitter shield 202 and receiver shield 204 are shielding structures that are able to block the passage of electric fields, yet allow the passage of magnetic flux. These shielding structures may include materials and thicknesses that are suitable for providing such electrical characteristics and functions. Details of the materials that can be used to form transmitter shields and receiver shields are discussed in further detail herein.

A. Shielding Material

According to some embodiments of the present disclosure, an electromagnetic shield, e.g., transmitter shield 202 and/or receiver shield 204, can be formed of a material having properties that enable magnetic flux to pass through but prevent electric fields from passing through. In a first example, an electromagnetic shield can be formed of a non-conductive material. Non-conductive materials naturally allow magnetic flux to pass through but prevents electric fields from passing through. In a second example, transmitter shield 202 can be formed of a conductive material that has a plurality of apertures. The conductive nature of the material allows voltage to be discharged to ground and the apertures provide avenues through which magnetic flux may tunnel to expose on transmitter shield 202. In a third example, transmitter shield 202 can be formed of a very thin conductive material that allows magnetic flux to pass through but prevents electric fields from passing through. The thickness of the conductive material can be thin enough to allow passage of magnetic flux and have low enough resistance to allow voltage to travel through the conductive material in an efficient manner. Materials of various conductive properties and thicknesses are discussed in FIGS. 3 and 4 herein.

Figure 3:
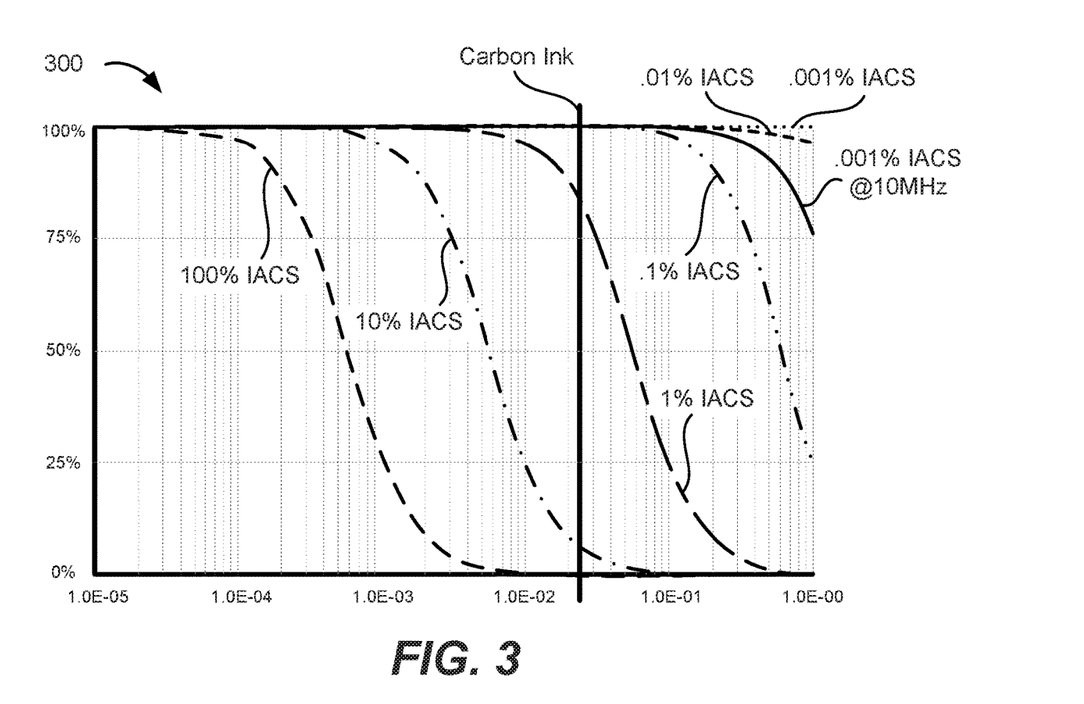
FIG. 3 is a graph representing a measure of mutual inductance achieved between a transmitter coil and a receiver coil when a shielding layer is disposed between the transmitter and receiver coils during wireless power transfer, according to some embodiments of the present disclosure.

FIG. 3 is a graph 300 representing a measure of mutual inductance achieved between a transmitter coil and a receiver coil when a shielding layer, e.g., any one of transmitter shield 202 or receiver shield 204, is disposed between the transmitter and receiver coils during wireless power transfer. The y-axis represents the percentage of mutual inductance attained between the transmitter and receiver coil increasing upward where 100% indicates that all of the magnetic flux generated by the transmitter coil is received by the receiver coil. The x-axis represents thickness of the shielding layer in a logarithmic scale ranging from 1.0E-05 to 1.0E-00 in millimeters increasing to the right.

Various curves are plotted against graph 300 as shown in FIG. 3. The various curves represent different conductive materials having different conductivities in terms of percentage of the conductivity of copper (i.e., % IACS, or percentage of the International Annealed Copper Standard). For instance, graph 300 may include curves representing materials having conductivities of 100% IACS, 10% IACS, 1% IACS, 0.1% IACS, 0.01% IACS, 0.001% IACS, and 0.001% IACS at a specific frequency of 10 MHz. Materials having higher conductivity, i.e., higher % IACS, means those materials are better at accommodating the movement of electric charge. The various curves can provide guidance on selecting material of a certain conductivity and thickness to allow a high percentage of mutual inductance between the transmitter and receiver coil. As shown, each curve represents an achievable mutual inductance between the transmitter and receiver coils based on its thickness for different materials having different conductivities. For instance, a transmitter shield formed of a material having a conductivity of 100% IACS may allow a mutual inductance of 100% when its thickness is approximately 1.0E-05 mm. In another example, a transmitter shield formed of a material having a conductivity of 1% IACS may allow a mutual inductance of 100% when its thickness is less than approximately 1.0E-03. Thus, as can be understood by graph 300, materials having higher conductivity can decrease the mutual inductance between the transmitter and receiver coil, but this decrease in mutual inductance may be compensated by decreasing the thickness of the shield. Allowing higher mutual inductance means that the wireless charging system is transferring power more efficiently and that the shield has less negative impact on wireless power transfer.

Figure 4:
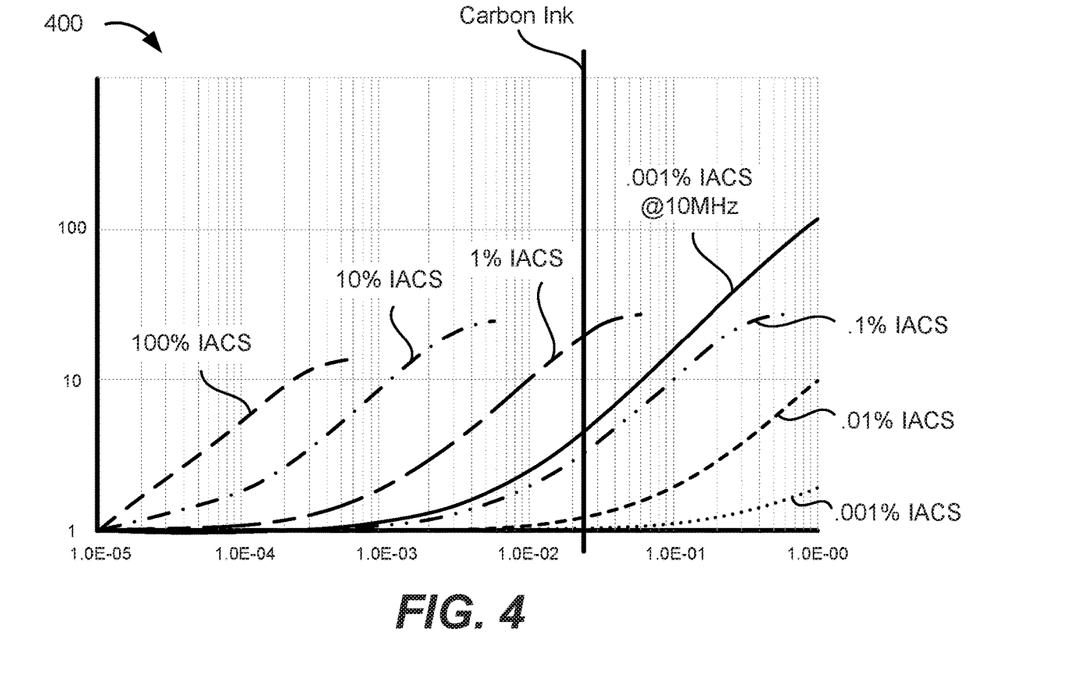
FIG. 4 is a graph representing an alternating current resistance (ACR) of a material based on its thickness, according to some embodiments of the present disclosure.

In addition to conductivity and mutual inductance, the resistivity of a material may also be considered when determining a suitable material for forming the shield. This is because the material cannot be so resistive that it is too difficult to route voltage on the shield to ground. FIG. 4 is a graph 400 representing an alternating current resistance (ACR) of a material based on its thickness. The ACR of a material represents the amount of resistance a material has when an alternating current (AC) voltage is applied. The y-axis represents the amount of resistance of a material in units of ohms increasing upward, and the x-axis represents thickness of the shielding layer in a logarithmic scale in millimeters increasing to the right.

Similar to graph 300 in FIG. 3, various curves are plotted against graph 400. The various curves may be curves for conductive materials having different conductivity in terms of % IACS. As shown in FIG. 4, the curves represent materials having the same conductivities as those shown in graph 300 of FIG. 3 for ease of reference and cross comparison. The various curves can provide guidance on selecting material of a certain resistance and thickness to form a shield that can enable the efficient discharge of accumulated voltage from an electric field without generating excessive heat. In FIG. 4, each curve may represent an amount of resistance based on its thickness for different materials having different conductivities. For instance, a transmitter shield formed of a material having a conductivity of 100% IACS may have a resistance of approximately 7 ohms when its thickness is approximately 1.0E-04 mm. In another example, a transmitter shield formed of a material having a conductivity of 1% IACS may have a resistance of approximately 10 ohms when its thickness is approximately 1.0E-02 mm. Thus, as can be understood by graph 400, the ACR of a material can increase as thickness increases, but the ACR can be decreased by using materials with lower conductivity. Having higher resistance means that it is more difficult to discharge voltage accumulated on the shield. Moving voltage through a material having high resistance results in the dissipation of energy in the form of heat, which can decrease efficiency and cause damage to electrical components in excessive degrees.

In some embodiments, a transmitter shield and/or a receiver shield can be formed of a material that allows high mutual inductance of between 90-100% and a mutual ACR of less than 10 ohms with a desired thickness determined by device design constraints. Thus, an exemplary material that can be used to form a transmitter shield can include nickel vanadium (NiV) with a thickness ranging between 25 to 100 nm. In a particular embodiment, the transmitter shield is formed of NiV with a thickness of approximately 50 nm. An exemplary material that can be used to form a receiver shield can include silver with a thickness ranging between 0.05 and 0.15 μm. In a particular embodiment, the receiver shield is formed of silver with a thickness of approximately 0.1 μm.

Although the shields may be formed of a conductive material, other materials having similar properties can be used instead. For instance, a material including carbon may be used to form the electromagnetic shields. In an example, the transmitter shield may include carbon ink, such as N6X carbon ink. Such an ink can be easily customized to achieve the electrical properties desired to allow passage of magnetic flux while preventing passage of electric fields. As shown in FIGS. 3 and 4, carbon ink is represented by a vertical line. This is because the thickness of carbon ink is dictated by the process with which the carbon ink is deposited. For instance, typical printing processes can print carbon ink in thicknesses of approximately 25 μm.

B. Exemplary Wireless Charging System with Electromagnetic Shielding

Figure 5:
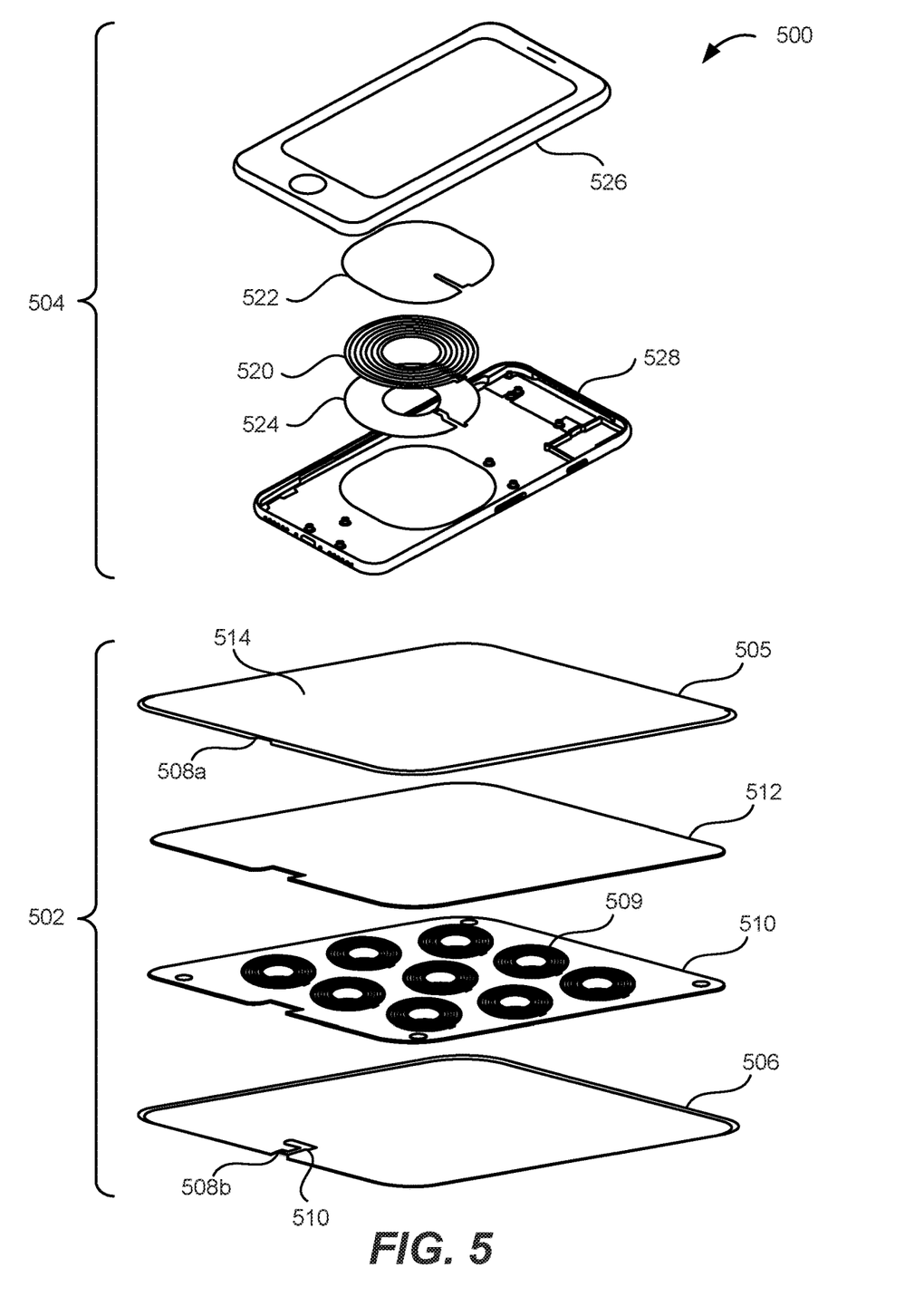
FIG. 5 illustrates an exploded view of an exemplary wireless charging system including a wireless charging device and an electronic device, each having electromagnetic shielding according to some embodiments of the present disclosure

As mentioned herein, a transmitter shield can be included in a wireless charging device, such as a wireless charging mat, and a receiver shield can be included in an electronic device configured to rest on the wireless charging device to wirelessly receiver power from the wireless charging mat. FIG. 5 illustrates an exploded view of an exemplary wireless charging system 500 including a wireless charging device 502 and an electronic device 504, each having electromagnetic shielding according to some embodiments of the present disclosure. Wireless charging device 502 can generate time-varying magnetic flux to induce a corresponding current in electronic device 504 for performing wireless power transfer.

Wireless charging mat 502 can include a housing formed of two shells: a first shell 505 and a second shell 506. First shell 505 can mate with second shell 506 to form an interior cavity within which internal components may be positioned. First and second shells 505 and 506 can also include notches 508a and 508b, respectively, that form an opening within the housing when first and second shells 505 and 506 are mated. An electrical connector 510, such as a receptacle connector, can be positioned within the opening so that wireless charging mat 500 can receive power from an external power source through a cable connected to electrical connector 510. In some embodiments, electrical connector 510 may include a plurality of contact pins and a plurality of terminals electrically coupled to the contact pins so that power can be routed from the external power source to the wireless charging mat 500 to provide power for wireless power transfer.

The interior cavity formed between mated first and second shells 505 and 506 can include components that generate the magnetic flux for performing the wireless charging of electronic device 504. As an example, an array of transmitter coils 509 coupled to a driver board 510 can be housed within the inner cavity. Transmitter coils 509 can be operated to generate time-varying magnetic flux that propagate above the top surface of first shell 505 to induce a current in receiver coil 520 in electronic device 504. Driver board 510 can be a printed circuit board (PCB) configured to route signals and power for operating transmitter coils 509.

In addition to transmitter coils 509 and driver board 510, wireless charging device 502 can also include a transmitter shield 512 according to some embodiments of the present disclosure. Transmitter shield 512 can be configured to allow passage of magnetic flux and to prevent passage of electric fields, as discussed herein with respect to transmitter shield 202 in FIG. 2. Accordingly, transmitter shield 512 can be positioned within wireless charging device 502 in a suitable location for blocking electric field from exposing on a receiver coil 520 in electronic device 504. For example, transmitter shield 512 can be positioned in the direction of magnetic flux flow, such as between transmitter coils 509 and first shell 505.

In some embodiments, first shell 505 includes a charging surface 514 upon which electronic device 504 having receiver coil 520 may be placed to receive power from wireless charging mat 502. Charging surface 514 can be a generally planar region of a top surface of shell 505 where magnetic flux generated by transmitter coils 509 is present to induce a current in receiver coil 520 for charging an internal battery of electronic device 504. Electronic device 504 may merely rest on charging surface 512 to receive power from wireless charging device 502. The interface (e.g., interface 112 in FIG. 1) where electronic device 504 makes contact with wireless charging device 502 can be a plane where respective housings of electronic device 504 and wireless charging device 502 make contact with each other. Magnetic flux generated by wireless charging device 502 can be shielded from internal components in electronic device 504 by a ferrite plate 522. In some embodiments, ferrite plate 522 is positioned above receiver coil 520 so that magnetic flux is first exposed to receiver coil 520 before being blocked by ferrite plate 522.

Electronic device 504 can include a top housing 526 and a bottom housing 528 that can mate to form an inner cavity that houses internal components, such as receiver coil 520 and ferrite plate 522. According to some embodiments of the present disclosure, electronic device 504 can also include an electromagnetic shield within its inner cavity. For example, electronic device 504 can include a receiver shield 524 that can be configured to allow magnetic flux generated by transmitter coils 509 to be received by receiver coil 520 but prevent electric fields from receiver coil 520 from exposing on transmitter coils 509, as discussed herein with respect to receiver shield 204 in FIG. 2. Receiver shield 524 can be positioned within electronic device 504 in a suitable location for blocking electric field from exposing on transmitter coils 509 in wireless charging device 502. For example, receiver shield 524 can be positioned between receiver coils 520 and bottom housing 528. In this position, the magnetic flux first passes through receiver shield 524 before exposing on receiver coil 520.

Implementing transmitter shield 512 and receiver shield 524 allows mutual inductance to exist between transmitter coils 509 and receiver coil 520, but prevents detrimental voltages from being generated in transmitter coils 509 and receiver coil 520. Preventing these voltages from being generated improves the operation of both wireless charging device 502 and electronic device by avoiding electrical disturbances.

II. Structure of Electromagnetic Shielding

The transmitter shield and receiver shield can each be formed to have a specific structure suitable for implementation in a wireless charging system for performing wireless power transfer without generating detrimental voltages on the transmitter and receiver coils. Details of the structure of transmitter and receiver shields will be discussed further herein.

A. Transmitter Shield

Figure 6:
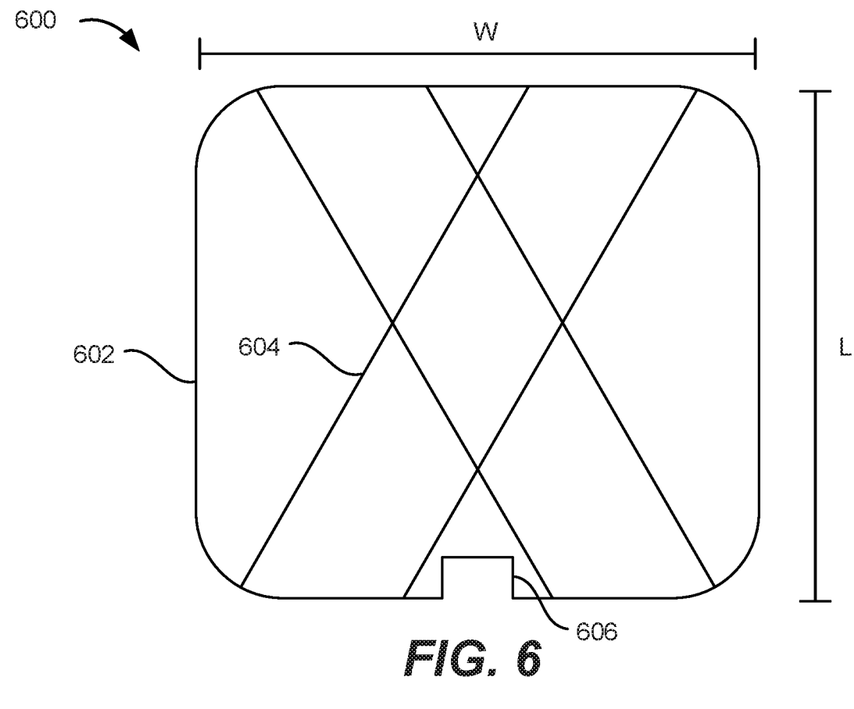
FIG. 6 illustrates a top-down view of an exemplary transmitter shield, according to some embodiments of the present disclosure.

FIG. 6 illustrates a top-down view of an exemplary transmitter shield 600, according to some embodiments of the present disclosure. Transmitter shield 600 can be housed in a wireless charging device, such as a wireless charging mat, e.g., wireless charging mat 502 having transmitter shield 512 in FIG. 5. In some embodiments, transmitter shield 600 can have dimensions that correspond to the dimensions of the wireless charging device. For instance, transmitter shield 600 can be in the shape of a rectangle having a width W and a length L that correspond to the width and length of the wireless charging device. Although transmitter shield 600 can be in the shape of a rectangle, it is to be appreciated that embodiments are not so limited that transmitter shields in other embodiments can have any other shape that corresponds to a wireless charging device, such as a square, rectangle, hexagon, triangle, and the like. In some embodiments, a notch 606 may be formed at an edge of transmitter shield 600 to provide space for other components in a wireless charging mat, such as a receptacle connector for making connection with an external cable to receive power from an external source.

Transmitter shield 600 may be coupled to ground at its edges 602 to discharge any voltage on transmitter shield 600. Voltage existing near the inner regions of transmitter shield 600 may have to travel to edges 602 by traversing across a large portion of transmitter shield 600, which may cause difficulties in routing the voltage to ground, e.g., by creating larger resistances. Thus, in some embodiments, one or more conductive traces 604 may be embedded within transmitter shield 600 to assist with discharging voltage to ground. The low resistivity and high conductivity of traces 604 provides an avenue through which voltage can quickly travel to edges 602. Accordingly, transmitter shield 600 may be able to quickly discharge voltage to ground.

Figure 7:
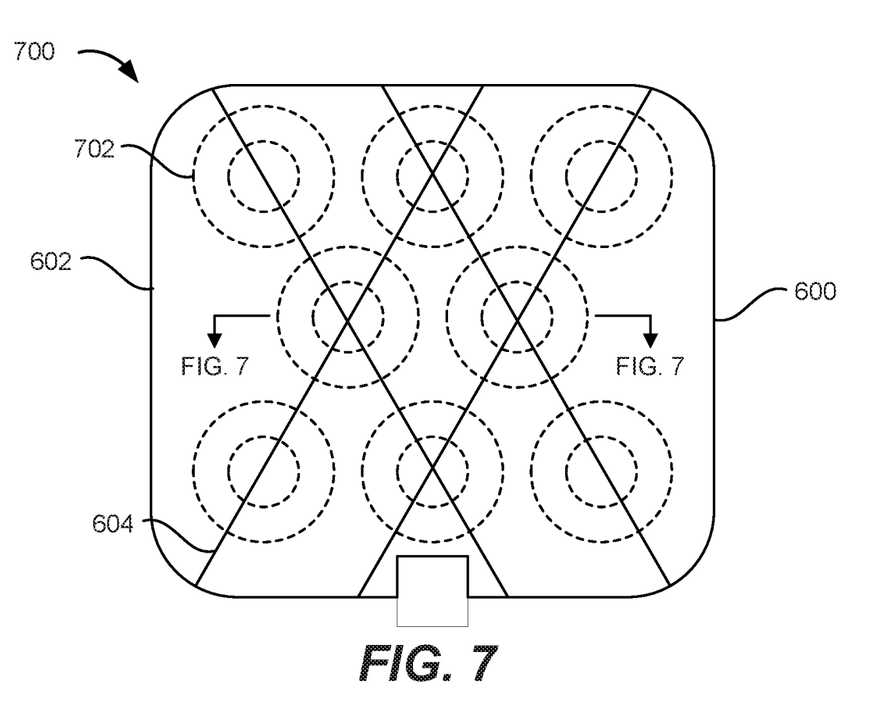
FIG. 7 illustrates a transmitter shield positioned over an array of transmitter coils, according to some embodiments of the present disclosure.

In some embodiments, transmitter shield 600 can have dimensions that are suitable for shielding an array of transmitter coils disposed within the wireless charging device. For example, FIG. 7 illustrates an exemplary wireless charging device 600 including transmitter shield 600 positioned over an array of transmitter coils 702. Transmitter coils 702 may be similar in function and form to transmitter coils 509 in FIG. 5. Upper layers of wireless charging device 700 are not illustrated so that transmitter shield 600 and transmitter coils 702 can be seen. Additionally, transmitter coils 702 are illustrated with dotted lines to indicate that transmitter coils are disposed below transmitter shield 600. Showing transmitter coils 702 helps to understand their relative position with respect to transmitter shield 600.

As shown in FIG. 7, transmitter shield 600 is large enough to cover the entire array of transmitter coils 708 so that each transmitter coil is shielded by transmitter shield 600. During operation, each transmitter coil 708 may generate magnetic flux that pass through transmitter shield 600 to induce a current on a receiver coil. Electric fields generated by the large voltage difference between a transmitter coil and a receiver coil may generate voltage in transmitter shield 600 around each transmitter coil. The generated voltage may flow across transmitter shield 600 to edges 602 and be discharged to ground.

As mentioned above, conductive traces 604 can be embedded in transmitter shield 600 to expedite the discharging of generated voltage on transmitter shield 600. Conductive trances 604 can be positioned over respective transmitter coils to route these voltages to ground at edges 602. Additionally, conductive traces 604 can be positioned orthogonal to the windings of each transmitter coil 702 to minimize current generation in conductive traces 604 during operation of transmitter coils 702. This current can be generated by electrical interaction between conductive traces 604 and magnetic flux generated by transmitter coils 702. The induced current may impede the ability to discharge voltage on transmitter shield 600. Thus, arranging conductive traces 604 orthogonal to the winding of transmitter coils 702 may minimize this induced current.

Figure 8:
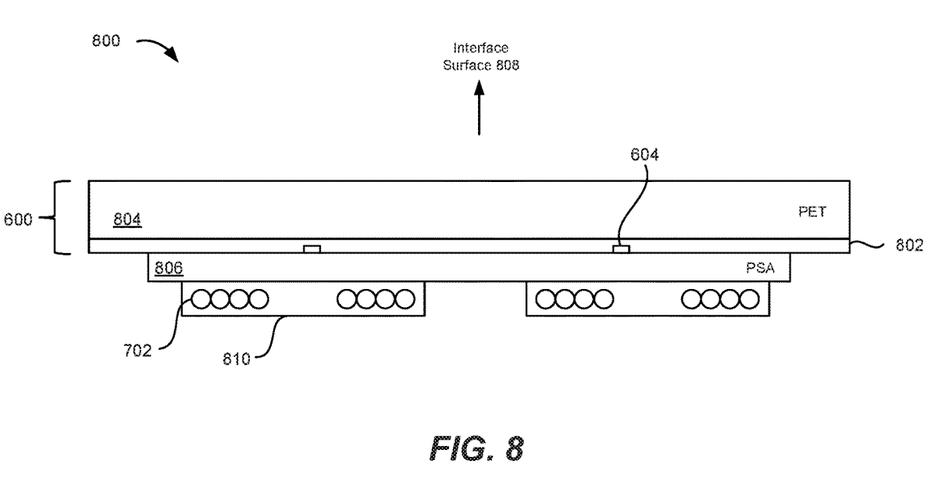
FIG. 8 illustrates a cross-section of a transmitter shield positioned over an array of transmitter coils, according to some embodiments of the present disclosure.

In some embodiments, transmitter shield 600 can be formed of a structure that includes more than one layer of material. FIG. 8 is a simplified diagram illustrating a cross section 800 of a transmitter shield and transmitter coils for a wireless charging device, according to some embodiments of the present disclosure. Specifically, FIG. 8 illustrates a cross-section of exemplary transmitter coil 702 and transmitter shield 600 shown in FIG. 6. Transmitter shield 600 may be disposed above transmitter coils 702 so that magnetic flux generated by transmitter coils 702 may flow upward through transmitter shield 600 toward an interface surface 808. Interface surface 808 may be a top surface of a housing of the wireless charging device, such as charging surface 514 in FIG. 5, that makes contact with a housing of an electrical device to perform wireless charging. Transmitter coils 702 can each be encapsulated by a protective layer such as coil encapsulating layer 810. Encapsulating layer 810 can be formed of any suitable non-conductive material for protecting transmitter coils 702, such as polyimide (PI).

According to embodiments of the present disclosure, transmitter shield 600 can include a conductive layer 802 for performing the electrical functions of transmitter shield 600. For instance, conductive layer 802 can be a layer of conductive material having properties that allow magnetic flux to pass through transmitter shield 600 but prevent electric fields from passing through transmitter shield 600, such as any of the conductive materials discussed herein with respect to FIGS. 3 and 4. In a particular embodiment, conductive layer 802 can be formed of NiV having a thickness of approximately 50 nm.

As mentioned herein, transmitter shield 600 can include conductive traces 604 for expediting the discharge of accumulated voltage from electric fields. As shown in FIG. 8, conductive traces 604 can be embedded within conductive layer 802 so that voltage existing in conductive layer 802 can flow into conductive traces 604 and be quickly routed to edges of transmitter shield 600 and discharged to ground.

Conductive layer 802 can be attached to a support structure configured to provide structural support for conductive layer 802. As an example, conductive layer 802 can be attached to substrate 804. In some embodiments, substrate 804 can be a base structure upon which conductive layer 802 may be deposited or laminated. Substrate 804 can be formed of a stiff material having a minimum thickness for surviving the deposition or lamination of conductive layer 802. For instance, substrate 804 may be formed of polyethylene terephthalate (PET) having a thickness ranging between 20 to 30 μm, particularly 26 μm in certain embodiments. Thus, substrate 804 can provide structural support for conductive layer 802.

In some embodiments, an adhesive layer 806 may fix conductive layer 802 over transmitter coils 702 so that conductive layer 802 is positioned to intercept electrical fields associated with transmitter coils 702 during wireless power transfer to prevent detrimental voltage from being generated on the receiver coil. Since transmitter coils 702 may not extend across the entire bottom surface of conductive layer 802, adhesive layer 806 may not have to extend across the entire bottom surface of conductive layer 802 either. Instead, adhesive layer 806 can just extend far enough to sufficiently couple transmitter coils 702 conductive layer 802. Accordingly, in some embodiments, adhesive layer 806 does not extend across the entire bottom surface of conductive layer 802, thereby reducing manufacturing cost. Adhesive layer 806 can be formed of any suitable non-conductive adhesive material. For example, adhesive layer 806 can be formed of pressure sensitive adhesive (PSA).

B. Receiver Shield

Figure 9:
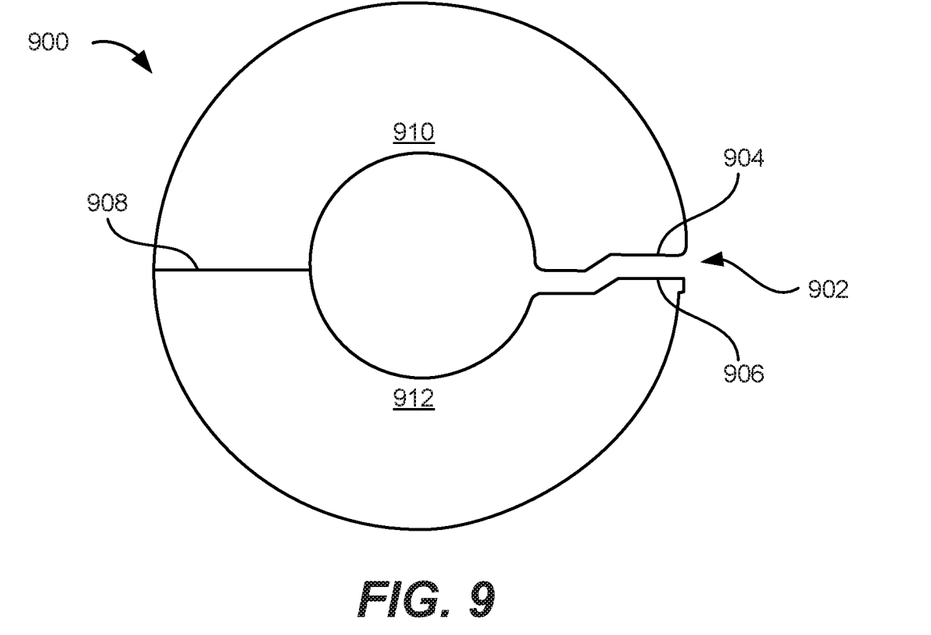
FIG. 9 illustrates a top-down view of an exemplary receiver shield, according to some embodiments of the present disclosure

FIG. 9 illustrates a top-down view of an exemplary receiver shield 900, according to some embodiments of the present disclosure. Receiver shield 900 can be housed in an electronic device, such as a smart phone, smart watch, tablet, laptop, and the like, e.g., electronic device 504 having shield 524 in FIG. 5. In some embodiments, receiver shield 900 can have dimensions that correspond to the dimensions of a receiver coil. For instance, receiver shield 900 can be generally circular in shape, or any other shape that corresponds to a receiver coil, such as a square, rectangle, hexagon, triangle, and the like. Receiver shield 900 may have a gap 902 to provide an area where a connection to ground can be routed for discharging voltage generated on receiver shield 900. Additionally, gap 902 can provide space for other components of the electronic device, such as connection terminals for a receiver coil, as will be discussed further herein.

In some embodiments, connection to ground can be established at an end 904 of receiver shield 900 closest to the top of gap 902 so that voltage generated on receiver shield 900 can be discharged to ground. While providing a connection to ground at end 904 helps discharge voltage on receiver shield 900, performance of receiver shield 900 can be improved by including a cut 908 in receiver shield 900 positioned opposite of gap 902 to electrically separate receiver shield 900 into two halves: first half 910 and second half 912. A connection to ground can be provided at end 906 closes to the bottom of gap 902 so that both halves 910 and 912 can be coupled to ground to discharge any voltage generated in receiver shield 900. Without cut 908 in receiver shield 900, the potential difference between ends 904 and 906 may be based on the voltage captured by the entire surface area of receiver shield 900. This can cause a large potential difference to build up between ends 904 and 906, and can be difficult to discharge to ground. By including cut 908, the potential difference can be substantially decreased, such as by a half, thereby making it easier to discharge the voltage to ground.

Figure 10:
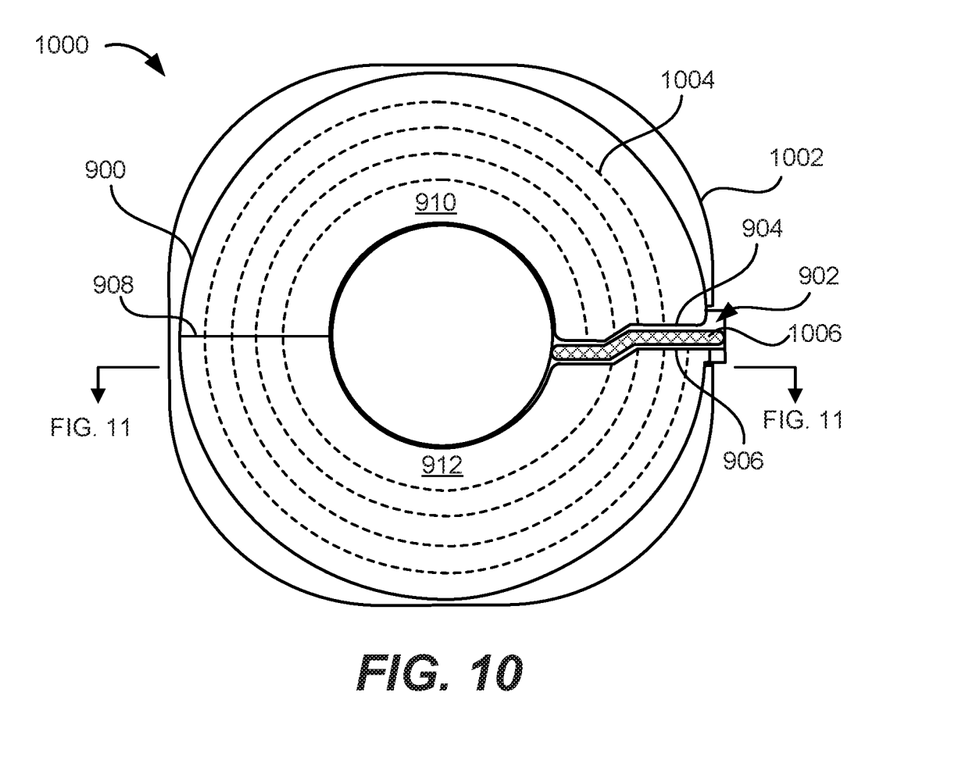
FIG. 10 illustrates a receiver shield positioned over a receiver coil, according to some embodiments of the present disclosure

Receiver shield 900 can have dimensions that are suitable for shielding a receiver coil disposed within the electronic device. For example, FIG. 10 illustrates a top-down view of an exemplary receiver system 1000 for an electronic device. Receiver system 1000 can include receiver shield 900, a ferrite plate 1002, and a receiver coil 1004 positioned between receiver shield 900 and ferrite plate 1002. Receiver coil 1004 is illustrated with dotted lines to indicate that transmitter coils are disposed behind receiver shield 900 as shown from the top-down perspective of FIG. 10. Showing receiver coil 1004 helps to understand its relative position with respect to receiver shield 900.

As shown in FIG. 10, receiver shield 900 is large enough to cover the entire receiver coil 1004 so that receiver coil 900 is completely shielded by receiver shield 900. In some embodiments, receiver coil 1004 can have a flat, disc-like shape formed of a winding of coil that is wound from an inner diameter to an outer diameter. Likewise, receiver shield 900 can also have a disk-like shape that has a corresponding inner and outer diameter. During operation, an electric field from receiver coil 900 can generate a voltage in receiver shield 900. The generated voltage may flow across receiver shield 900 to at least one of ends 904 and 906 and be discharged to ground.

In some embodiments, connection terminals 1006 can be positioned in gap 902 of receiver shield 900. Connection terminals 1006 can provide electrical routes through which current induced in receiver coil 1004 can be routed to provide power to charge a battery in the electronic device. Additionally, connection terminals 1006 can include ground lines for routing voltage in receiver shield 900 to ground. For instance, receiver shield 900 can include a single ground line for routing voltage from the entire receiver shield 900 to ground (e.g., in instances where cut 908 is not present), or it can include two ground lines, one for routing voltage from first half 910 of receiver shield 900 to ground, and another for routing voltage from a second half 912 of receiver shield 900 to ground. Each ground line can be positioned close to the respective end for which it discharges voltage to ground. For example, the ground line for grounding first half 910 can be positioned close to end 904, while the ground line for grounding second half 912 can be positioned close to end 906.

Ferrite plate 1002 can be positioned on a side of receiver coil 1004 opposite of the side on which receiver shield 900 is positioned. Ferrite plate 1002 can prevent magnetic flux and electrical fields from disturbing sensitive electrical components within the electronic device. In some embodiments, ferrite plate 1002 can be formed of any suitable ferromagnetic material. To better understand the structural layering of receiver system 1000, a cross-sectional view of receiver system 1000 is shown in FIG. 11.

Figure 11:
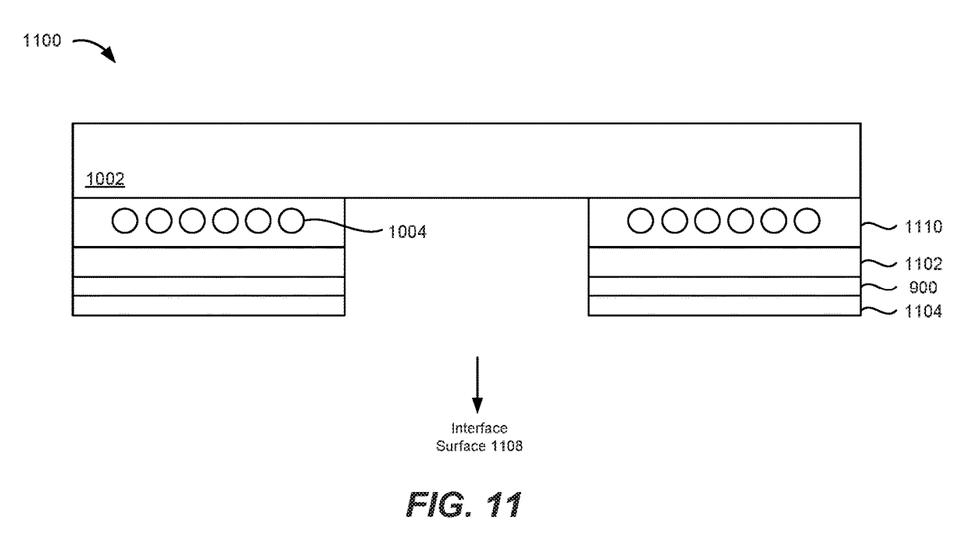
FIG. 11 illustrates a cross-section of a receiver shield positioned over a receiver coil, according to some embodiments of the present disclosure

FIG. 11 is a simplified diagram illustrating a cross section 1100 of receiver system 1000, according to some embodiments of the present disclosure. Receiver system 1000 can include receiver shield 900 coupled to receiver coil 1004, which is coupled to ferrite plate 1002. Receiver coil 1004 can be positioned below ferrite plate 1002 so that ferrite plate 1002 can protect sensitive electrical components from magnetic flux and electrical fields generated during wireless power transfer. Receiver shield 900 may be disposed below receiver coil 1004 so that magnetic flux generated by a transmitter may flow upward from interface surface 1108 through receiver shield 900 before being received by receiver coil 1004. Interface surface 1108 may be a bottom surface of a housing of the electronic device that makes contact with a charging surface of a wireless charging device for performing wireless charging. Receiver coil 1004 can be encapsulated by a protective layer, such as coil encapsulating layer 1110. Encapsulating layer 1110 can be formed of any suitable non-conductive material for protecting receiver coil 1004, such as polyimide (PI).

According to embodiments of the present disclosure, receiver shield 900 can be formed of a layer of conductive material that can perform the electrical functions of a receiver shield discussed herein. For instance, receiver shield 900 can be a layer of conductive material having properties that allow magnetic flux to pass through receiver shield 900 but prevent electric fields from passing through receiver shield 900, such as any of the conductive materials discussed herein with respect to FIGS. 3 and 4. In a particular embodiment, receiver shield 900 can be formed of silver, such as silver flake, having a thickness of approximately 0.1 µm.

Receiver shield 900 can be coupled to receiver coil 1004 by an adhesive layer 1102. Adhesive layer 1102 may fix receiver shield 900 underneath receiver coil 1004 so that receiver shield 900 is positioned to intercept electrical fields associated with receiver shield 900 during wireless power transfer to prevent detrimental voltage from being generated on the transmitter coil. In some embodiments, adhesive layer 1102 can be configured to route voltage to ground by coupling with a connection terminal, such as connection terminal 1006 in FIG. 10. Thus, adhesive layer 1102 can be formed of any suitable conductive adhesive material. For example, adhesive layer 1102 can be formed of conductive pressure sensitive adhesive (CPSA).

In some embodiments, receiver shield 900 can be covered by a protective layer 1104. Protective layer 1104 can be positioned below receiver shield 900 to cover any exposed surfaces and prevent receiver shield 900 from oxidizing. Protective layer can be formed of any suitable dielectric material.

Spatially relative terms, such as "bottom," "top," "upward," or "downward" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device may be otherwise oriented (e.g., rotated 90 degrees or at other orientations) and the spatially relative descriptors used herein interpreted accordingly.

Although the invention has been described with respect to specific embodiments, it will be appreciated that the invention is intended to cover all modifications and equivalents within the scope of the following claims.

What is claimed is:

1. A wireless charging system, comprising:
a transmitter coil configured to generate a magnetic flux;
a receiver coil positioned coaxial with the transmitter coil to receive the generated magnetic flux, wherein electrical interaction between the transmitter coil and the receiver coil generates electric fields;
a transmitter shield positioned between the transmitter coil and the receiver coil to intercept some of the electric fields directed away from the transmitter coil and allow the magnetic flux to pass through the transmitter shield; and
a receiver shield positioned between the transmitter shield and the receiver coil to intercept some of the electric fields directed away from the receiver coil and allow the magnetic flux to pass through the receiver shield, the receiver shield comprising an annular layer of conductive material having a gap and a cut positioned opposite to and separate from the gap, wherein the gap and the cut each extend completely across the receiver shield from an inner diameter of the receiver shield to an outer diameter of the receiver shield to electrically separate the receiver shield into a first half and a second half, and wherein one or more connection terminals for the receiver shield are positioned in the gap.

2. The wireless charging system of claim 1, wherein the transmitter shield and the receiver shield are each grounded to discharge voltage generated by the electric fields.

3. The wireless charging system of claim 1, wherein the transmitter shield is positioned along a direction of the magnetic flux.

4. The wireless charging system of claim 1, wherein the transmitter shield is formed of a conductive material.

5. The wireless charging system of claim 4, wherein the conductive material is NiV.

6. The wireless charging system of claim 1, wherein the transmitter shield has a thickness between 20-30 um.

7. A wireless charging device configured to generate magnetic flux to perform wireless power transfer, the wireless charging device comprising:
   a driver board;
   a plurality of transmitter coils disposed above the driver board and configured to generate the magnetic flux upward;
   an electromagnetic shield disposed above the plurality of transmitter coils, and configured to be transparent to magnetic flux and opaque to electric fields, the electromagnetic shield comprising:
   a substrate comprising a stiff material; and
   a conductive layer disposed on a bottom surface of the substrate, the conductive layer having an annular shape and including a gap and a cut positioned opposite to and separate from the gap, wherein the gap and the cut each extend completely across the conductive layer from an inner diameter of the conductive layer to an outer diameter of the conductive layer to electrically separate the electromagnetic shield into a first half and a second half, and wherein one or more connection terminals for the electromagnetic shield are positioned in the gap; and
   an adhesive layer disposed between the plurality of transmitter coils and the electromagnetic shield, the adhesive layer configured to attach the electromagnetic shield to the plurality of transmitter coils.

8. The wireless charging device of claim 7, wherein the electromagnetic shield further includes conductive traces embedded within the conductive layer.

9. The wireless charging device of claim 8, wherein the traces are grounded.

10. The wireless charging device of claim 9, wherein the traces are positioned perpendicular to coils of wire of the plurality of transmitter coils.

11. The wireless charging device of claim 7, wherein the conductive layer is NiV.

12. The wireless charging device of claim 7, wherein the conductive layer has a thickness between 25 to 100 nm.

13. The wireless charging device of claim 7, further comprising a ferrite layer disposed between the driver board and the plurality of transmitter coils.

14. An electronic device configured to receive magnetic flux for wireless power transfer, the electronic device comprising:
   a ferrite layer;
   a receiver coil disposed below the ferrite layer,
   an electromagnetic shield disposed below the receiver coil, the electromagnetic shield configured to be transparent to magnetic flux and opaque to electric fields, the electromagnetic shield comprising an annular layer of conductive material having a gap and a cut positioned opposite to and separate from the gap, wherein the gap and the cut each extend completely across the electromagnetic shield from an inner diameter of the electromagnetic shield to an outer diameter of the electromagnetic shield to electrically separate the electromagnetic shield into a first half and a second half, and wherein one or more connection terminals for the electromagnetic shield are positioned in the gap;
   a conductive adhesive layer disposed between the receiver coil and the electromagnetic shield, wherein the conductive adhesive layer attaches the electromagnetic shield to the receiver coil; and
   a protection layer disposed on a bottom surface of the electromagnetic shield.

15. The electronic device of claim 14, wherein the receiver coil comprises:
   a coil of wire; and
   an insulating material attached to the coil of wire.

16. The electronic device of claim 15, wherein the insulating material is PI.

17. The electronic device of claim 14, wherein the electromagnetic shield comprises a conductive layer.

18. The electronic device of claim 17, wherein the conductive layer is formed of silver.

19. The electronic device of claim 14, wherein the electromagnetic shield has a thickness between 0.05 and 0.15 μm.

20. The electronic device of claim 14, wherein the conductive adhesive layer is conductive pressure sensitive adhesive.

* * * * *